United States Patent
Laurent et al.

(10) Patent No.: US 10,063,938 B2
(45) Date of Patent: Aug. 28, 2018

(54) DECODER AND METHOD AT THE DECODER FOR SYNCHRONIZING THE RENDERING OF CONTENTS RECEIVED THROUGH DIFFERENT NETWORKS

(75) Inventors: Anthony Laurent, Cesson Sevigne (FR); Eric Gautier, Cesson Sevigne (FR); Philippe Gilberton, Cesson Sevigne (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 437 days.

(21) Appl. No.: 13/417,291

(22) Filed: Mar. 11, 2012

(65) Prior Publication Data
US 2012/0230389 A1    Sep. 13, 2012

(30) Foreign Application Priority Data
Mar. 11, 2011    (EP) .................................... 11305271

(51) Int. Cl.
| H04N 7/12 | (2006.01) |
| H04N 21/81 | (2011.01) |
| H04N 21/235 | (2011.01) |
| H04N 21/43 | (2011.01) |
| H04N 21/435 | (2011.01) |
| H04N 21/462 | (2011.01) |
| H04N 21/8547 | (2011.01) |

(52) U.S. Cl.
CPC ....... *H04N 21/8126* (2013.01); *H04N 21/235* (2013.01); *H04N 21/435* (2013.01); *H04N 21/4307* (2013.01); *H04N 21/4622* (2013.01); *H04N 21/814* (2013.01); *H04N 21/8133* (2013.01); *H04N 21/8547* (2013.01)

(58) Field of Classification Search
USPC ...................................................... 375/240.01
See application file for complete search history.

(56) References Cited

U.S. PATENT DOCUMENTS

| 6,262,776 | B1 | 7/2001 | Griffits | |
| 7,031,348 | B1 * | 4/2006 | Gazit | ............... H04N 21/23406 348/423.1 |
| 2006/0034583 | A1 | 2/2006 | Shimizu | |

(Continued)

FOREIGN PATENT DOCUMENTS

| EP | 2178306 | 4/2010 |
| JP | 11168729 | 6/1999 |

(Continued)

OTHER PUBLICATIONS

European Search Report dated Aug. 3, 2011.

(Continued)

*Primary Examiner* — Tracy Y Li
(74) *Attorney, Agent, or Firm* — Jerome G. Schaefer (57) ABSTRACT

A method of decoding an audio/video content transmitted over a broadband network. The method being based on the quick decoding of the first frames of a group of pictures without rendering them if the group of pictures arrives too late to be rendered synchronously with another audio/video content received through a broadcast network. The method allowing the synchronized rendering of contents respectively received over broadcast and broadband networks as soon as possible for the viewer.

20 Claims, 6 Drawing Sheets

(56) References Cited

U.S. PATENT DOCUMENTS

| | | | |
|---|---|---|---|
| 2006/0143335 | A1 | 6/2006 | Ramamoorthy et al. |
| 2006/0146780 | A1* | 7/2006 | Paves ............................ 370/348 |
| 2006/0220930 | A1 | 10/2006 | Lee |
| 2008/0212774 | A1* | 9/2008 | Moors et al. ................. 380/201 |
| 2008/0304810 | A1* | 12/2008 | Rijckaert et al. ............... 386/68 |
| 2009/0096921 | A1 | 4/2009 | Katayama |
| 2009/0168903 | A1 | 7/2009 | Vaquero et al. |
| 2010/0150529 | A1* | 6/2010 | Leichsenring et al. ......... 386/95 |
| 2010/0183000 | A1 | 7/2010 | Nakayama et al. |
| 2011/0169966 | A1* | 7/2011 | Norman et al. .............. 348/194 |
| 2012/0002731 | A1* | 1/2012 | Pelts ........................ H04N 7/52 375/240.25 |
| 2012/0019719 | A1 | 1/2012 | Takesue et al. |
| 2012/0246690 | A1* | 9/2012 | Einarsson et al. ............ 725/109 |

FOREIGN PATENT DOCUMENTS

| | | |
|---|---|---|
| JP | 200488366 | 3/2004 |
| JP | 2004193673 | 7/2004 |
| JP | 2004297628 | 10/2004 |
| JP | 2010171697 | 8/2010 |
| JP | 2010245974 | 10/2010 |
| WO | WO2008062979 | 5/2008 |
| WO | WO2010001609 | 1/2010 |

OTHER PUBLICATIONS

Fibush et al., "Timing and synchronization using MPEG-2 transport streams", SMPTE Journal vol. 105 n7 Jul. 1, 1996 pp. 395-400.
Lin et al., "Perceptual Quality Based Packet Dropping for Generalized Video GOP Structures", 2009 IEEE International Conference on Acoustics, Speech, and Signal Processing, 2009, vols. 1-8.
Lee et al, "Dynamic Thermal Management for MPEG-2 DecodingISLPED '06": Proceedings of the 2006 International Symposium on Low Power Electronics and Design, 2006 pp. 316-321.
Pantos et al., "HTTP Live Streaming", draft-pantos-http-live-streaming-01,Jun. 8, 2009.
RFC 3550, "RTP: A Transport Protocol for Real-Time Applications", Packet Design, Jul. 2003.
RFC-2326, "Real Time Streaming Protocol (RTSP)" Real Networks, Apr. 1998.
ISO/IEC 13818-1, "Information technology Generic coding of moving pictures and associated audio information: Systems", Dec. 1, 2000.
ISO/IEC 13818-2, "Generic Coding of Moving Pictures and Associated Audio", Mar. 25, 1994.
ISO/IEC 14496-12, "Information technology—Coding of audio-visual objects", Oct. 1, 2005.
RFC 2250, "RTP Format for MPEG1/MPEG2 Video", AT&T Labs—Research, Jan. 1998.
RFC-3984, "RTP Payload Format for H.264 Video", The Internet Society, Feb. 2005.
Matsumara et al., "Personalization of Broadcast Programs using Synchronized Internet Content", Consumer Electronics (ICCE), 2010 Digest of Technical Papers International Conference on, Jan. 9-13, 2010, pp. 145-146.
M. Armstrong et al, "Enabling and enriching broadcast services by combining IP and broadcast delivery," BBC Research White Paper WHP 185, Sep. 2010.
ETSI TS 102 823 Digital Video Broadcasting (DVB);Specification for the carriage of synchronized auxiliary data in DVB transport streams Nov. 2005.
ETSI TS 102 796, "Hybrid Broadcast Broadband TV", Oct. 2010.
Mills et al., "Network Time Protocol (Version 3) Specification, Implementation and Analysis," Network Working Group David L. Mills Request for Comments: 1305, Mar. 1992.
Rauschenbach et al., "A Scalable interactive TV service supporting synchronized delivery over broadcast and Broadband networks", IBC Conference, Sep. 2004.
ISO/IEC 13818-16, "Information technology—Generic coding of moving pictures and associated audio information: Systems", Sep. 1, 1998.
ETSI TS 102 809 V1.1.1, "Digital Video Broadcasting (DVB); Signalling and carriage of interactive applications and services in Hybrid broadcast/broadband environments", Jan. 2010.
Youview "Core Technical Specification", for Launch Apr. 14, 2011, Version 1.0.
Howson et al: "Combining future internet media with broadcast TV content", NEM Summit proceedings 2011, Sep. 27-29, 2011.
Howson et al: "Second screen TV synchronization", IEEE ICCE Berlin 2011 Proceedings, Sep. 6-8, 2011.
Korean Office Action dated Mar. 28, 2018.

\* cited by examiner

DECODER AND METHOD AT THE DECODER FOR SYNCHRONIZING THE RENDERING OF CONTENTS RECEIVED THROUGH DIFFERENT NETWORKS

This application claims the benefit, under 35 U.S.C. §119 of EP Patent Application 11305271.6, filed 11 Mar. 2011.

FIELD OF THE INVENTION

The present invention relates generally to a method for decoding an audio video program received through a broadband network and more particularly to a method to synchronize the rendering of a content received through a broadband network with the rendering of a content received through a broadcast network.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Over the past few years the traditional TV broadcasting landscape of terrestrial, satellite and cable networks has been extended with the roll out of TV and video services over broadband internet protocol (IP) networks. These networks are complementary, with broadcast distribution adapted for live events and mass distribution and broadband distribution adapted for on-demand, catch-up and personalized services. Such a complementarity offers the perspective of a hybrid model in which the strengths of each network are leveraged to provide enhanced TV and video services in an efficient manner. Broadcast events can be enriched with personalized content delivered over broadband, this content being streamed or pushed beforehand. Such hybrid services may require that components delivered over the separate networks are tightly synchronized. One typical example illustrating this need of fine synchronization is a user watching a broadcast program who selects a foreign audio sequence that is not broadcasted but available over broadband. One other example is to enrich the broadcast content by delivering over broadband another video component, this last being for instance, according to the broadcast component, a scalable video coding (SVC) enhancement layer, a multi-view video coding (MVC) component to propose the event in 3D or another view of the same scene.

The ways to deliver this additional component over broadband are multiple. A first solution based on on-demand delivery is to use hypertext transfer protocol (HTTP) streaming, as described in the document "HTTP Live Streaming, draft-pantos-http-live-streaming-01—R. Pantos, Apple Inc Jun. 8, 2009" or to rely on the real-time transfer protocol (RTP) over UDP/IP as defined in the recommendation RFC 3550, "A Transport Protocol for Real-Time Applications". In this last case a communication protocol as Real Time Streaming Protocol (RTSP), described in the recommendation RFC 2326 is associated to RTP. Another solution based on multicast delivery is to use RTP protocol (RTP/UDP/IP) as defined in the document "A Transport Protocol for Real-Time Applications".

In the case of on demand delivery the request of the content can embed a timing information representing the presentation timestamp (PTS) of the first audiovisual sample to be delivered. It is not the case when the terminal subscribes to a multicast stream. The terminal cannot request it for a given timestamp and the behavior is analogous to the broadcast network one where the client suffers from the content delivery constraints.

Some characteristics for a network are its latency and its jitter. That means that it does not take the same duration to deliver content over one network and over another one.

The particularity of a broadcast network is that the content arrives to the receiver without it has to request anything, i.e. this last receives content permanently, and the delivery has a limited jitter that can be treated at the receiver with a limited size of buffer. The content delivery duration comprises the content delivery duration over the broadcast network from the server to the terminal and the duration the terminal needs to demultiplex, to buffer and to decode the content.

A broadband network can be seen as a personalized delivery network because it delivers content only on request of the receiver.

Figure 1:
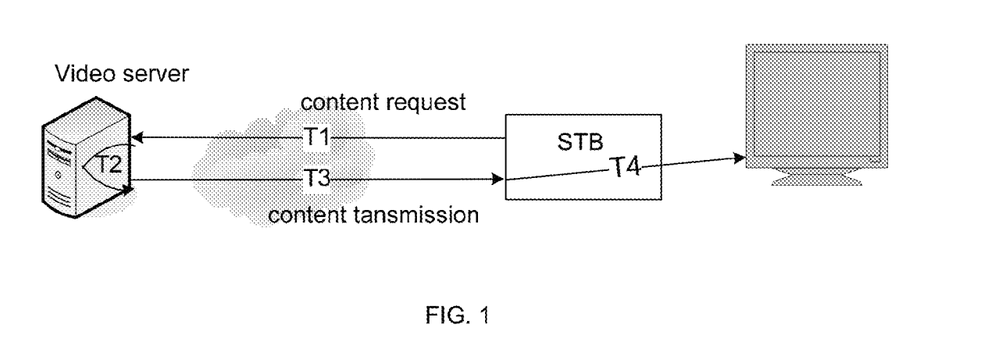
FIG. 1 illustrates the delivery over a broadband network.

FIG. 1 illustrates the delivery of a program content over a broadband network. A video server delivers the program content to a set-top box receiver (STB). The set-top box receives and decodes the content in order to display it on a display device. The delivery can be split in four main steps and corresponding durations:

The duration the request needs to reach the server is T1.
The duration the server takes to treat the request and to emit the program content is T2.
The duration of the program content delivery from the server to the set-top box is T3.
The duration the set-top box needs to buffer, decode and display the program content is T4.

The delivery in a hybrid broadcast broadband context does not necessarily imply that the time format is the same for all the components. In the MPEG-2 transport stream format (commonly used for broadcast networks), the timing information is based on a program clock reference (PCR) format whereas the network time protocol (NTP) is the format used for the timing of the stream encoded in the Real-Time Transport protocol (commonly used for broadband networks). Moreover, two components can have the same time format but the time references can differ (offset values). To compensate the mentioned timing issues between components, a mechanism must be implemented to transpose the timing format and/or reference in the ones of the other component. The timing format and/or reference of the component(s) delivered over broadband are lined up with the ones of the component(s) delivered over broadcast, this last being the "master" component. In the herein description, it is estimated that when timing formats and/or references are different this timing alignment operation is implicitly done to synchronize the components and when we evoke timing values they refer to timing values in the same transposed referential (same format and same initial value). This unique time referential is called system clock.

The component delivered over broadcast is called "main component" and the component delivered over broadband is called "personalized component".

The method to deliver a personalized component is described here. The personalized component is requested by the terminal and is sent over a bidirectional broadband network. The delivery can be either linear or non linear.

A linear delivery ensures that the terminal receives a component at a quite constant rate. It can be not exactly constant due to the jitter network. Two cases can be considered for the delivery of a personalized component to be synchronized with a broadcasted main component. Either the personalized component stream can be received, decoded and presented before the corresponding frames of the main component are presented or it arrives after and in this case all the frames of the personalized component are useless.

The typical case of a linear delivery mechanism is when the terminal subscribes to a multicast stream by transmitting a request to join a multicast group as defined in the Internet Group Management Protocol (IGMP protocol). With a multicast stream deliver, the terminal cannot receive the stream from a defined timestamp. In this case, and if the personalized component arrives later than the corresponding frames of the main component, it is not possible to synchronize their rendering.

The real-time transfer protocol (RTP) is also well known for the linear delivery. RTP protocol allows the request of a content from a given timestamp which is equal to the current reception time reference plus an offset. The terminal estimates the offset in order to request the content in advance so as to receive the content before it needs to be decoded and rendered. If the offset is incorrectly evaluated, the personalized component is received too late to be synchronized with the main component. Consequently the client must stop the reception of the current streaming and it must evaluate more accurately the offset and then transmits a new request based on the new estimated offset value.

A non-linear delivery is a mechanism in which the terminal receives the content in a non regular way. A part of the content is delivered at a higher rate than it is presented. In example, the frame rate reception is higher than the frame rate presentation. The idea of the non linear delivery is to offer the possibility to a terminal receiving a personalized component that is first late to be presented to catch up the main component to be able to present it at a given moment.

A Real-Time Streaming Protocol (RTSP) server can also deliver content in a non-linear way. Depending on the request parameters, it can, for instance, deliver the first frames or group of pictures of a program content in a burst and then deliver the content at a cruising rate. In case of using RTSP, the terminal requests for a given presentation timestamp.

The Hyper Text Transfer Protocol (HTTP) streaming is another type of non linear delivery. The personalized component is split in many successive parts called chunks. A chunk is either a file or a part of a file including a piece of information describing it. The piece of information may comprise for example a time slot, a file name, a byte range, a bit-rate or any other information that may be useful for a terminal for decoding and rendering the chunk's content. The encoding of chunks containing video is starting with a key-frame which can be decoded without reference to a previous frame. The key-frame is for example an I-picture (or I-frame) as defined in MPEG compression standard (ISO/IEC13818). A chunk contains one or several full groups of pictures (GOPs) as defined in MPEG compression. When receiving content with the use of HTTP streaming, the terminal requests for a chunk to the server. The server then transmits the chunk with best effort. The content is transmitted into successive bursts.

The non-linear delivery offers the possibility to a terminal to synchronize the rendering of a personalized component to the rendering of a main component by sending successive requests in order to get some pieces of the personalized content, starting with a key-frame, that are synchronized with the main component in term of system clock, decoding time reference and presentation time reference.

A disadvantage of such a synchronization is that when a terminal requests for a personalized component to be synchronized with a main component and receives a content, starting with a key-frame, for which the decoding and presentation time reference indicate that the reception is too late to be synchronized with the main component, the discarded content may correspond to an important time range (up to many seconds) in term of rendering. The terminal has then to send one or more new requests and to receive new personalized stream content until the decoding and presentation time reference indicates that the synchronization is possible in the terminal.

SUMMARY OF THE INVENTION

The purpose of the invention is to overcome the disadvantage of the prior art. More specifically, the invention provides an optimization of the delay required to synchronize the rendering of the personalized component with the rendering of the main component.

In the context of a hybrid broadcast and broadband delivery of components requiring a tight synchronization, the invention proposes a method that enhances the user experience in reducing significantly the latency of access to the on-demand component (personalized component). The use of the method of the invention consequently minimizes the impact of a bad estimation of the time reference parameter from which the on-demand (personalized) component must be transmitted to the terminal in order to be synchronized with the main component. In this method, the frames of the component delivered over broadband are treated even if they arrive after the moment when the broadcasted content frames to be rendered at the same time are presented. The method is based on the fact that the delivery frame rate of the broadband component is higher than the presentation frame rate, so that, at a given moment, a part of the broadband component, for which the system clock reference is lined-up with the system clock reference of the broadcast component, can be presented at the same time that the corresponding part of the broadcast component.

The method of the invention disregards the usual behavior of a video decoder where frames are decoded at a rhythm given by the decoding timestamps and where a decoded frame is systematically rendered. The method decodes as quickly as possible the first frames of a group of pictures of the broadband component that arrives late but without rendering them. Consequently these frames will be simply dropped for the rendering. Nevertheless, because the decoding of a frame which is not a key-frame needs to be decoded in reference with one or more previous or next frames, the frames that are decoded but not rendered are used for the decoding of the other frames of the group of pictures that are on time to be rendered.

The method of the invention is for decoding a second program content received through a broadband network, the rendering of the program content being to be synchronized with the rendering a first program content, the method comprising the steps of decoding the first program content with respect to a program clock reference, decoding the second program content comprising successive second frames associated with decoding time information and presentation time information with respect to the program clock reference. The method further comprises the steps of decoding the second frames of the second program content when the decoding time information is inferior to the program clock reference and rendering the decoded second frames when the presentation time information is such that the rendering of the second frames can be synchronized with the rendering of the first program content.

According to an embodiment of the invention, the step of decoding the second frames comprises the steps of reading decoding time stamp associated with one of the second frame and decoding the second frames according to a comparison result between the decoding time stamp and the program clock reference.

According to an embodiment of the invention, the step of rendering the decoded second frames comprises the steps of reading presentation time stamp associated with a the second frame and rendering the second frames according to a comparison result between the presentation time stamp and the program clock reference.

According to an embodiment of the invention, the first program content comprises successive first frames associated with decoding time information and presentation time information.

According to an embodiment of the invention, the decoding time information comprises decoding time stamps.

According to an embodiment of the invention, the presentation time information comprises presentation time stamps.

According to an embodiment of the invention, the first program content is received from a broadcast network by a first decoder apparatus and the second program content is received from a broadband network by a second decoder apparatus.

The invention also concerns a decoder apparatus comprising decoding means for decoding a program content received from a broadband network and comprising successive frames associated with decoding time information and presentation time information with respect to a program clock reference. The decoding means of the decoder apparatus are adapted to decode the frames when the decoding time information is inferior to the program clock reference, and in that the decoding means further comprises means for rendering the decoded frames when the presentation time information is superior or equal to the program clock reference.

According to an embodiment of the invention, the decoder apparatus further comprises a filtering module adapted to parse the decoding time information and the presentation time information for filtering the frames according to a comparison result between the decoding time information and the presentation information respectively compared to a program clock reference.

BRIEF DESCRIPTION OF THE DRAWINGS

The invention will be better understood and illustrated by means of the following embodiment and execution examples, in no way limitative, with reference to the appended figures on which.

Figure 2:
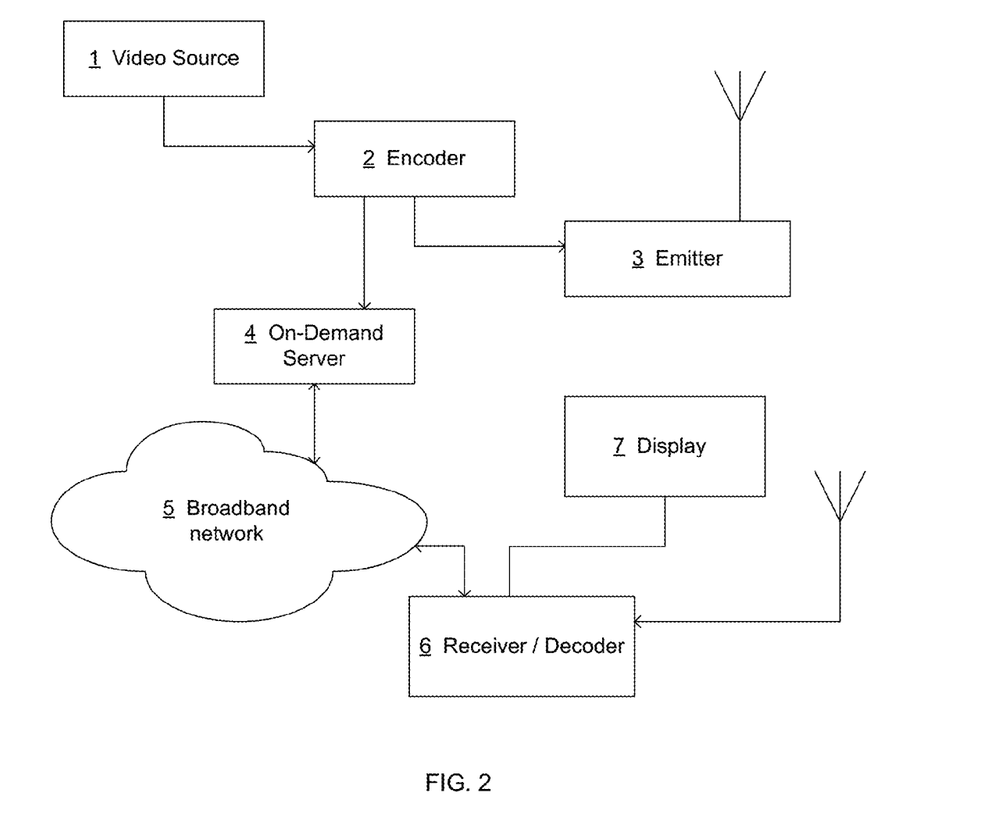
FIG. 2 is a block diagram of a system compliant with a first embodiment of the invention.
Figure 3:
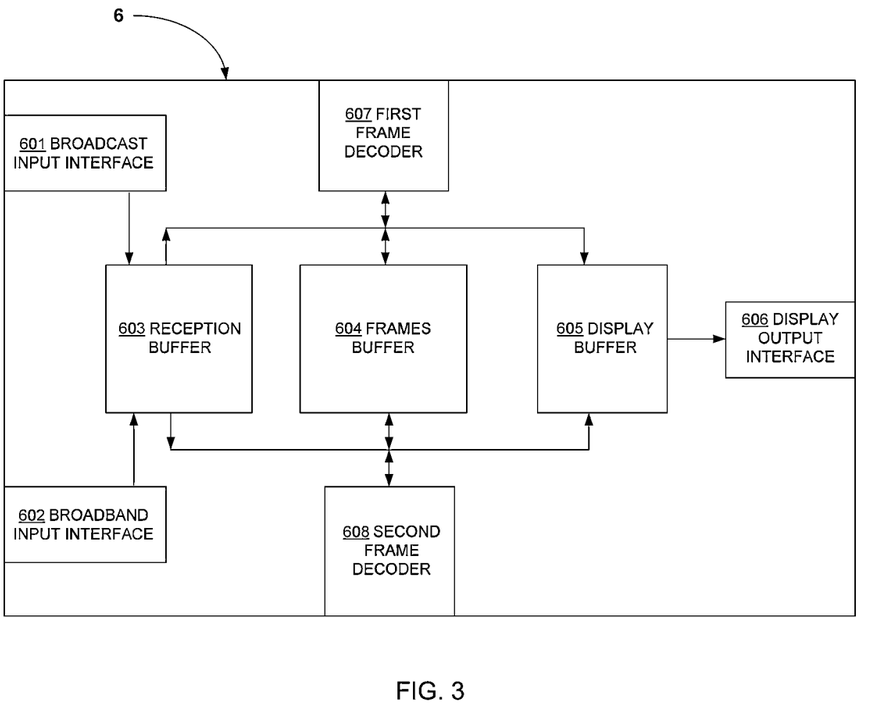
FIG. 3 is a block diagram of a receiver/decoder compliant with the first embodiment of the invention.
Figure 7:
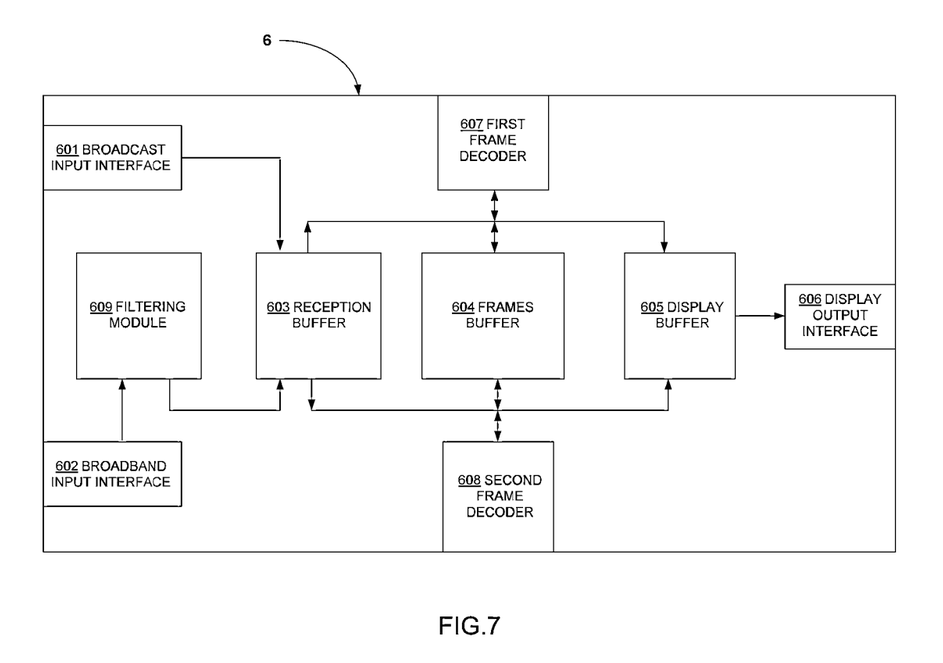
FIG. 7 is a block diagram of a receiver/decoder according to a second embodiment of the invention.

In FIG. 2, FIG. 3 and FIG. 7, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It has to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

FIG. 2 illustrates a network architecture according to a first embodiment of the invention. The broadcast timing is considered as a reference and the broadband network is adapted for the synchronization. A video source 1 delivers a non-encoded main component program to an encoder 2. The encoder 2 encodes the main component and transmits it to an emitter 3. The broadcasting of the main component by the emitter 3 could be done simultaneously with the encoding by the encoder 2 but also later. The main component is broadcasted over the air to a receiver/decoder 6. The encoder 2 also provides an encoded personalized component program to an on-demand server 4. The personalized component is synchronized with the main component. The encoder 2 can provide the personalized component during the encoding, but the personalized component can also be already available on the on-demand server 4. It can be available in a database of personalized component related to the main component to be broadcasted. The time reference information such as the decoding time stamps, the presentation time stamps and the program clock reference of both components are synchronized by the encoder 2. The way timing formats and/or references are lined up by the encoder 2 is out of scope.

The receiver/decoder 6 requests the personalized component to the on-demand server 4 through a broadband network 5 upon initial request from the user. The personalized component is then delivered by the on-demand server 4 to the receiver/decoder 6 through the broadband network. The receiver/decoder 6 processes an accelerated decoding phase of the personalized component in order to synchronize its rendering with the rendering of the main component broadcasted by the emitter 3. Both components are rendered in a synchronized way and outputted by the receiver/decoder 6 in order to be displayed on the display device 7.

According to the embodiment of the invention, the synchronization of the personalized component and the main component is defined as what is commonly used by the one skilled in the art. In other words, if the main component and personalized component are both video contents, then the synchronization corresponds, for example, to the fact that the rendering of the personalized component processes a GOP comprising a presentation time reference (to define the presentation time) close to a presentation time reference comprised in a GOP processed to render the main component. Two video components can be, for example, considered as synchronized in term of rendering if two GOPs belonging respectively to the first and the second video contents are both rendered, at least partially, in a time range of a couple of seconds or less. Regarding the synchronization of an audio and a video component, the synchronization is based on the well-known "lip sync" synchronization where an audio stream comprising vocals should be synchronized to the movements of the lips of the person who is talking (or singing). The target of the "lip sync" is to have a matching of lip movements with sung or spoken vocals.

FIG. 3 illustrates a receiver/decoder 6 according to the first embodiment of the invention. The decoder has two input interfaces. A first input interface 601 is connected to receive the broadcasted main component. A second input interface 602 is connected to receive the personalized component delivered through the broadband network. Both components are transmitted as successive packets indentified by program identifiers and containing some successive groups of pictures (GOP). The broadcast input interface 601 and the broadband input interface 602 achieve the demultiplexing of their respective received contents and store the data corresponding to each component in a dedicated buffer area of the reception buffer 603. Each GOP starts by a first frame so-called key-frame which is associated to a decoding time stamp (DTS) and a presentation time stamp (PTS). A first frame decoder 607 processes a normal decoding by reading the packets of the main components in the reception buffer 603. When a key frame received in a packet from the broadcast input interface 601 has a decoding time stamp that is equal to the current program clock reference (PCR), the first frame decoder 607 operates the decoding of the frame and stores the corresponding decoded frame in the frame buffer 604. The first frame decoder 607 also reads the frames in the frame buffers 604 and transfers a key-frame in the display buffer 605 when the presentation time stamp of the key-frame is equal to the PCR value. The display output interface 606 reads the content of the display buffer and outputs the frames to a connected display device (not represented). The process of decoding and transferring in the display buffer is the same for the successive frames of the current GOP coming from the broadcast input interface until the next key-frame is read in the reception buffer 603 by the first frame decoder 607. The first frame decoder 607 achieves the decoding and the display of the broadcasted main component by starting decoding a group of pictures when the DTS of the key-frame of the GOP is equal to the PCR value and by starting presenting the decoded frames in the display buffer 605 when the PTS of the key-frame is equal to the PCR value.

The second frame decoder 608 operates a decoding of the personalized component received through the broadband input interface 602 by decoding all the corresponding frames read in the reception buffer 603 until the DTS of a key-frame is greater than or equal to the current PCR value. This is the case for the GOPs that arrive late from the broadband input interface 602 to be rendered in a synchronized way with the corresponding broadcasted content received from the broadcast input interface 601. The second frame decoder 608 decodes the frames from the reception buffer 603 even if the associated DTS is smaller than the current PCR value. The decoded frames are stored in the frames buffer 604. The second frame decoder 608 also reads the decoded frames corresponding to the personalized component in the frames buffer 604 and transfers the decoder frames to the display buffer 605 when the corresponding PTS is equal to the current PCR value. If the associated PTS of the frame of the personalized component is smaller than the current PTS, the frame is not copied in the display buffer. The second frame decoder 608 operates an accelerated decoding phase when the DTS information are smaller than the PCR value and a normal decoding once the DTS values are equal or greater than the PCR value.

Figure 4:
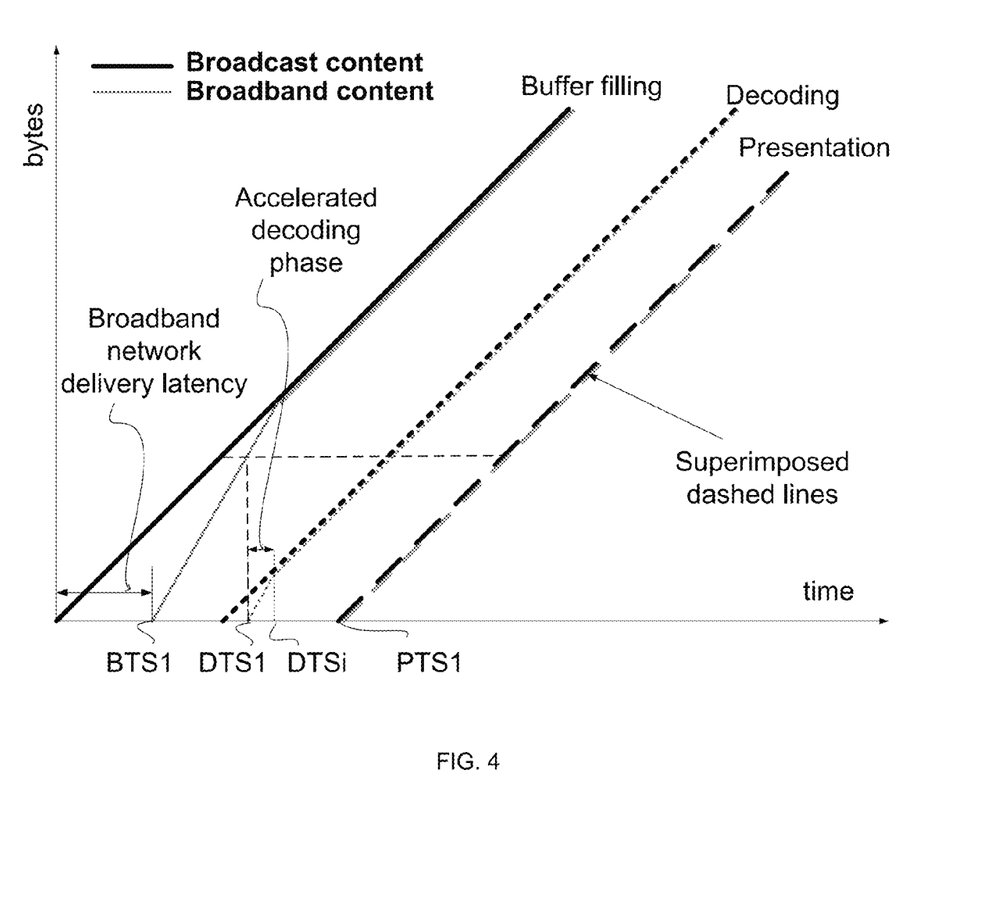
FIG. 4 illustrates a first case of accelerated decoding according to the first embodiment of the invention.

FIG. 4 illustrates an accelerated decoding process according to a first embodiment of the invention. The figure shows a case where the first frames of the personalized component received through the broadband network are too late to be decoded and synchronized with the main component at a normal decoding rate. The synchronized rendering of both components can therefore be achieved by using an accelerated decoding phase which does not consider the DTS values. Such a case depends on the network latency. The figure shows that the filling of the buffer is quicker for the broadband content (personalized component) in a first step since the broadband network can achieve transmission at a higher rate than the decoding and presentation rate (burst mode), before being transmitted at a cruising rate in a second step. The broadband buffer filing starts from BTS1 time, when the first data of the personalized content are received. When the buffer contains enough data (considering for example the bit-rate of transmission as defined in MPEG compression standard), the accelerated decoding phase starts at DTS1 time. During the accelerated decoding, the frames are decoded even if their corresponding DTS information is smaller than the PCR value. The decoding rate is then higher than in normal mode when the decoder waits for a PCR value equal to the DTS to start the decoding of a frame. In the represented case, because the broadband content is not too late to be rendered in a synchronized way with the broadcast content (main component), the accelerated decoding allows to have some decoded pictures from the broadband content with PTS values greater than or equal to the PCR value. No decoded frame is discarded for the rendering. When the accelerated decoding phase allows to store some pictures in the reception buffer that have a DTS information equal or greater than the PCR value, the accelerated decoding phase finishes and the decoding continues at a normal rate.

Figure 5:
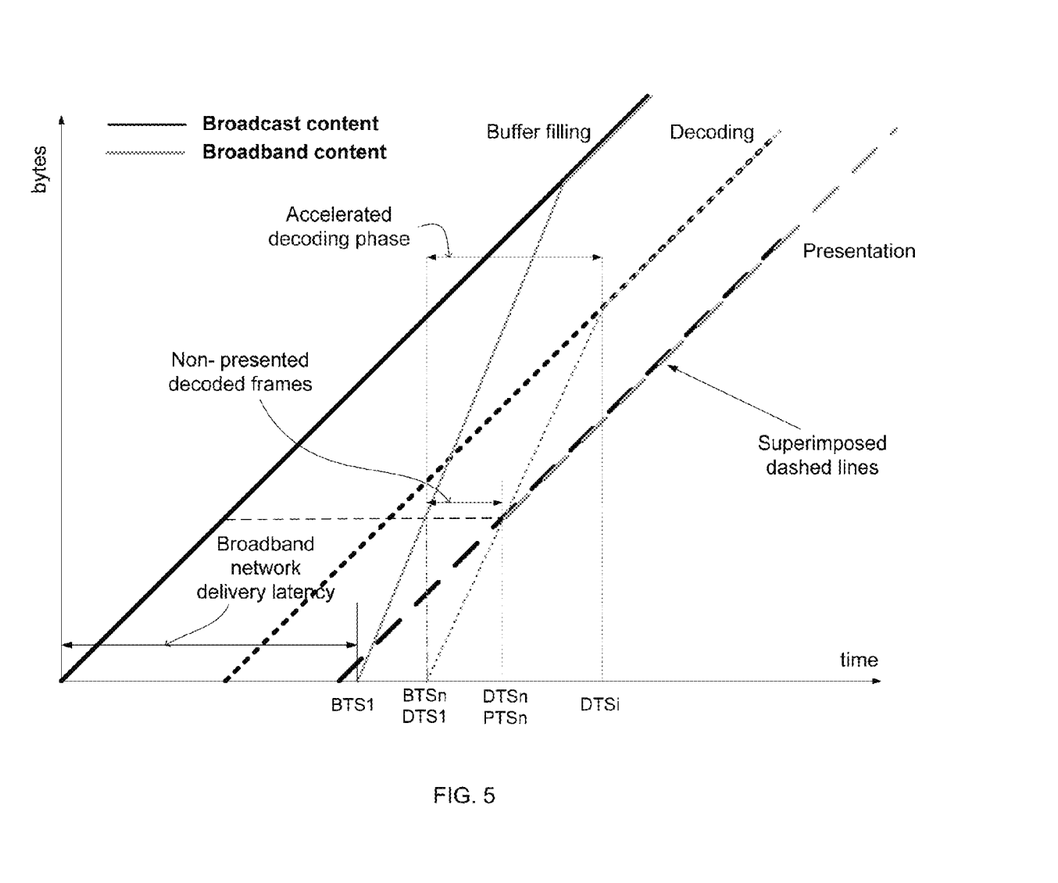
FIG. 5 illustrates a second case of accelerated decoding according to the first embodiment of the invention.

FIG. 5 illustrates a case of accelerated decoding according to a first embodiment of the invention with a broadband network latency bigger than the case showed in FIG. 4. The latency of the broadband network is so big that the incoming frames are too late to be decoded and too late to be presented at the beginning of the decoding. The first frames to be decoded from the broadband network are stored in the reception buffer from the time BTS1. The filing rate of the buffer is quicker than for the content received from the broadcast network because of the burst capacity of the broadband network. When there are enough data in the reception buffer (depending, for example, on the bit-rate or according to a compression standard), at DTS1 time, the accelerated decoding phase starts but the decoding frames are too late to be rendered in a synchronized way with the broadcast content. The decoded frames are discarded for the presentation and only the decoded frames from the broadcast content are rendered. During the accelerated decoding, at DTSn time, the decoded frame of the broadcast content has an associated PTS that is in line with the PCR value. So the rendering of the broadband content and broadcast content can be synchronized. Finally, at DTSi time, the incoming frames from the broadband network have an associated DTS value to be decoded in time according to a normal decoding process. The accelerated decoding phase finishes and the decoding continues in a normal mode.

Figure 6:
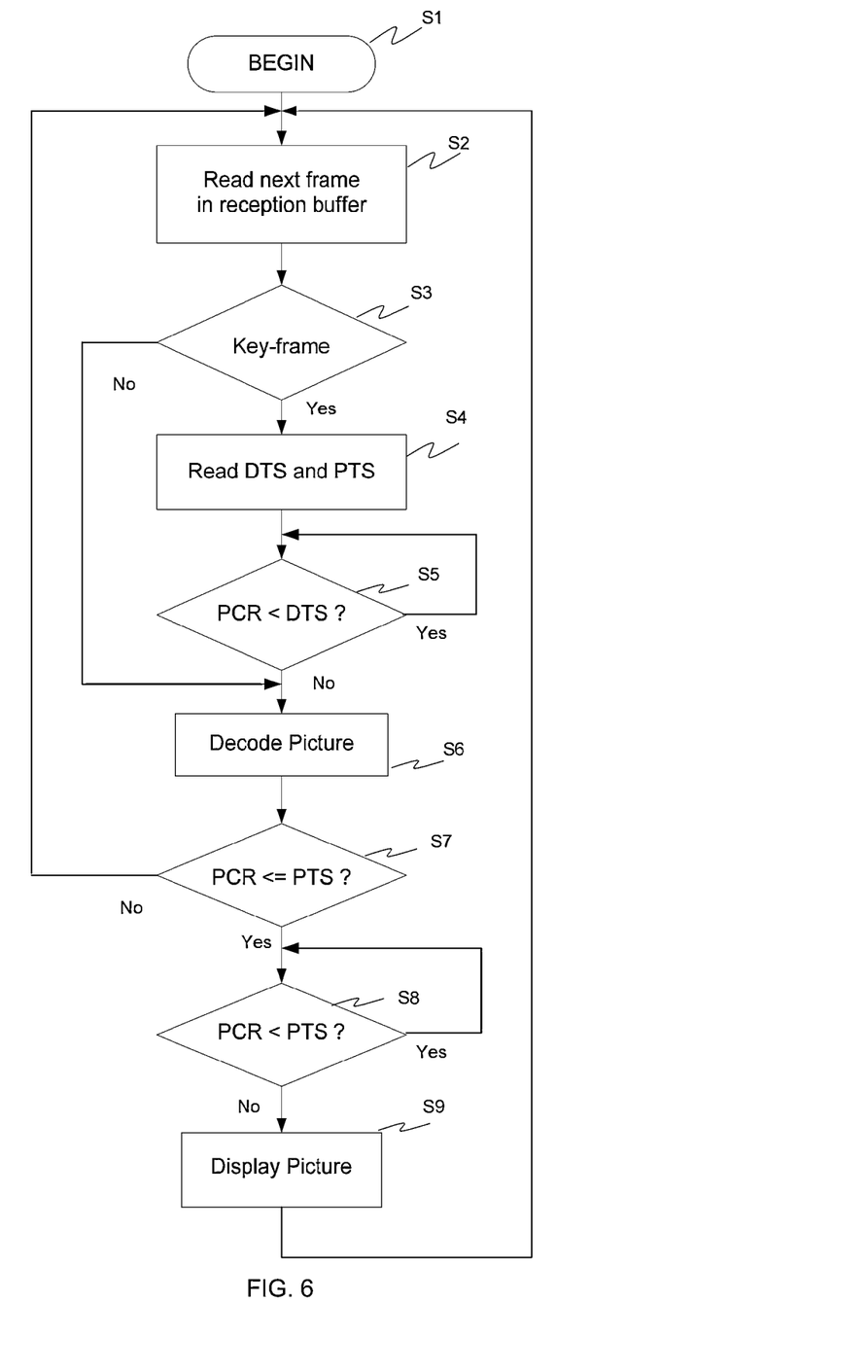
FIG. 6 is a diagram describing the method of decoding according to the first embodiment of the invention.

FIG. 6 is a flowchart illustrating the method of decoding by the second frame decoder, comprising an accelerated decoding phase. The second frame decoder is in charge of decoding and rendering the personalized component received from the broadband network. It is to be considered that at step 51 which is the beginning of the decoding process for the second frame decoder, the first frame received in the reception buffer is a key-frame, associated with decoding time stamp and presentation time stamp.

At step S2, the second frame decoder reads a frame and determines at step S3 if it is a key-frame or not. If it is not a key-frame, the decoding process continues on the next frame without any consideration of the decoding time stamp value associated with the previous key-frame. So the process goes through step S6. This case corresponds to a picture in a GOP which is not a key-frame. At step S4, the PTS and DTS information associated with the key-frame are read by the second frame decoder. At step S5, the second frame decoder compares the DTS value with the PCR value. If the DTS is smaller than the current PCR value, the frame is read too late to be decoded in time. So the frame is decoded immediately at step S6 in order to be available in the decoded frames buffer for the decoding of the next frames. At step S5, if the frame is not too late, when DTS is greater than the PCR value, the process loops on Step S5 until the PCR value is greater or equal to the DTS. This is the case in a normal decoding mode (not accelerated). At step S7, the second frame decoder compares the PTS value to the PCR value in order to define whether the frame must be displayed or discarded. If PTS is smaller than the PCR value, then the decoded frame is too late to be rendered in a synchronized way with the main component. The process loops to step S2. If the PTS is greater than or equal to the PCR value, then the frame is not too late and must be rendered in time with the PCR. The process loops on step S8 until the PCR is greater than or equal to the PTS. When this condition is met, at step S9, the second frame decoder copies the frame from the decoded frames buffer to the display buffer for rendering. The process then loops on Step S2.

The method for decoding used by the second frame decoder is then a method for decoding a second program content received through a broadband network, the rendering of the second program content being to be synchronized with the rendering of a first program content, the first program content being received through a broadcast network. The method comprising the steps of decoding the first program content with respect to a program clock reference, decoding the second program content comprising successive second frames associated with decoding time information and presentation time information with respect to the program clock reference. The method is characterized in that it further comprises the steps of decoding the second frames when the decoding time information is inferior to the program clock reference (S4, S5, S6) and rendering the decoded second frames when the presentation time information is such that the rendering of the second frames can be synchronized with the rendering of the first program content (S8, S9).

According to a variant of the embodiment, the decoding and rendering of the main component and the personalized component are achieved in two separated apparatus. Each of the two apparatus comprises means for receiving, decoding and rendering the associated components. The apparatus that decodes the personalized component uses a non-conventional decoding that allows the decoding of a program content received from a broadband network and comprising successive frames associated with decoding time information and presentation time information with respect to a program clock reference. The decoding means of the apparatus that decodes the personalized component are adapted to decode the frames when the decoding time information is inferior to the program clock reference and comprise means for rendering the decoded frames when the corresponding presentation time information is superior or equal to the program clock reference.

In this case, the two apparatus comprise means to exchange information about the decoding and rendering of the current program being received and rendered. In particular, the apparatus that decodes the personalized component have to know what part of the main component is currently decoded and rendered in order to select/request the corresponding piece of the personalized component from a remote server. The information transmitted by the apparatus that receives and decodes the main component to the apparatus that receives and decodes the personalized component is, for example, a time index in the program, a program clock reference value used for the rendering, or any other value that allows the identification of the current part of the main component currently decoded and rendered.

Such an apparatus may comprise a filtering module adapted to parse the decoding time information and presentation time information for filtering the frames according to a comparison result between the decoding time information and the presentation information compared to a program clock reference.

The apparatus used for the decoding of the personalized component according to this variant of the embodiment is for example an internet tablet connected to a home gateway allowing the user to see a view of a multi-view program, the main view being broadcasted and rendered on another apparatus such as, for example, a terrestrial digital TV set.

FIG. 7 illustrates a receiver/decoder 6 according to a second embodiment of the invention. The personalized component (from broadband network) is composed of successive chunks containing many groups of pictures, the filtering module 609 filters the chunk content received at the broadband input interface 602 by reading some time reference information inside the chunk and/or in the group of pictures. The filter module 609 compares the time information within the received content with the program time references used by the receiver/decoder 6 for decoding and rendering. If the filter module detects that a chunk or a GOP is too late to synchronize the rendering of its content with the rendering of the received broadcast content, the GOP or chunk is not transmitted to the reception buffer. This avoids the second frame decoder 608 to decode a content present in the reception buffer 603 that can't be synchronized with the broadcast content. This filtering makes the rendering of both components possible earlier.

According to a third embodiment of the invention, the personalized component received over the bidirectional broadband network is an audio content comprising successive blocks of audio samples. Each of the blocks of audio samples comprising a time reference information for its decoding and rendering. The filtering module of the receiver/decoder filters parses the time information and transfers the blocks to the reception buffer only if the time reference information indicates that the samples can be decoded in time to be rendered in a synchronized way with the main component.

Obviously, the invention is not limited to main component and personalized component comprising video or audio carried as successive groups of pictures or chunks. The invention concerns all synchronized program contents comprising time reference information required for their decoding and presentation in a receiver that can be compared with the program clock reference (system clock).

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

The invention claimed is:

1. A method for decoding a program content received from a broadband network by a broadband interface, said decoding being performed by a decoder apparatus, a rendering of said received program content to be synchronized with a rendering of another program content, said another program content being decoded by another decoder apparatus with respect to a program clock reference, said received program content comprising frames associated with decoding time information and presentation time information with respect to said program clock reference, said method comprising:
when a frame of said received program content is associated with a decoding time information being less than a current value of said program clock reference, decoding said frame.

2. The method according to claim 1, wherein said decoding time information comprises decoding time stamps.

3. The method according to claim 2, wherein decoding said frames comprises reading a decoding time stamp associated with said frame and decoding said frames according to a comparison result between said decoding time stamp and a current value of said program clock reference.

4. The method of claim 1, wherein said frames are comprised in groups of frames of said received program content, each frame of said groups being associated with a presentation time information with respect to said program clock reference, and said method comprises:
decoding the frames of the group comprising said frame associated with a decoding time information being less than a current value of said program clock reference;
rendering a frame of said decoded group when said associated presentation time information is such that the rendering of said frame can be synchronized with the rendering of said another program content.

5. The method according to claim 4, wherein rendering a frame of said decoded group comprises reading a presentation time stamp associated with said frame of said decoded group and rendering said frames of said decoded group according to a comparison result between said presentation time stamp and a current value of said program clock reference.

6. The method according to claim 4, wherein said another program content comprises successive first frames associated with decoding time information and presentation time information.

7. The method according to claim 6, wherein said decoding time information comprises decoding time stamps.

8. The method according to claim 6, wherein said presentation time information comprises presentation time stamps.

9. The method according to claim 4, wherein said presentation time information comprises presentation time stamps.

10. The method according to claim 4, wherein said frame of said decoded group is rendered when said associated presentation time information is greater than or equal to a current value of said program clock reference.

11. A decoder apparatus for decoding a program content received from a broadband network, wherein rendering of said received program content to be synchronized with rendering of another program content received from a broadcast network and decoded with respect to a program clock reference, said program content-comprising successive frames associated with a decoding time information and presentation time information with respect to a program clock reference, said decoder apparatus comprising said broadband input interface adapted to receive said program content, and being adapted to decode said program content with respect to said program clock reference, wherein said decoder apparatus comprises:
a frame decoder adapted to decode said frames, said decoding being operated for one of said frames being associated with a decoding time information being less than a current value of said program clock reference.

12. The decoder apparatus according to claim 11 wherein in said decoder apparatus comprises:
said broadcast input interface adapted to receive said another program content from said broadcast network; and
said decoder adapted to decode said another program content with respect to said program clock reference.

13. The decoder apparatus according to claim 12, wherein said another program content comprises successive frames associated with decoding time information and presentation time information.

14. The decoder apparatus according to claim 13, wherein said decoding time information comprises decoding time stamps.

15. The decoder apparatus according to claim 13, wherein said presentation time information comprises presentation time stamps.

16. The decoder apparatus according to claim 11, wherein said frame decoder is adapted to operate with an accelerated rate until decoding time information of one of said frames is greater than said program clock reference and to operate with a normal rate once decoding time information of one of said frames is equal or greater than said program clock reference.

17. The decoder apparatus according to claim 11, wherein said frames associated with decoding time information are comprised in groups of frames of said received program content, each frame of said groups being associated with a presentation time information with respect to said program clock reference, and wherein:
said frame decoder is adapted to decode the frames of the group comprising said frame associated with a decoding time information being less than a current value of said program clock reference; and
said decoder apparatus comprises a display buffer adapted to render said frames of said decoded groups when said presentation time information is greater than or equal to said program clock reference.

18. The decoder apparatus according to claim 17, comprising a filtering module adapted to parse said decoding time information and presentation time information for filtering said frames according to a comparison result between said decoding time information and said presentation information compared to a current value of said program clock reference.

19. The decoder apparatus according to claim 17, wherein said presentation time information comprises presentation time stamps.

20. The decoder apparatus according to claim 11, wherein said decoding time information comprises decoding time stamps.

* * * * *